(12) United States Patent  (10) Patent No.: US 7,696,860 B2
Gilson et al.  (45) Date of Patent: Apr. 13, 2010

(54) ELECTROMAGNETIC FIELD TACTILE DISPLAY INTERFACE AND BIOSENSOR

(75) Inventors: Richard D. Gilson, Oviedo, FL (US); J. Christopher Brill, Orlando, FL (US); Gary A. Zets, Maitland, FL (US); Bruce J. P. Mortimer, Maitland, FL (US)

(73) Assignee: University of Central Florida Research Foundation, Inc, Orlando, FL (US)

( * ) Notice: Subject to any disclaimer, the term of this patent is extended or adjusted under 35 U.S.C. 154(b) by 420 days.

(21) Appl. No.: 11/644,702

(22) Filed: Dec. 22, 2006

(65) Prior Publication Data

US 2007/0139167 A1 Jun. 21, 2007

Related U.S. Application Data

(63) Continuation-in-part of application No. 11/250,878, filed on Oct. 14, 2005, now abandoned.

(51) Int. Cl.
*H04B 3/36* (2006.01)
*G06F 3/01* (2006.01)

(52) U.S. Cl. .................. 340/407.1; 340/407.2; 715/701; 715/702; 901/32

(58) Field of Classification Search .............. 340/407.1; 715/702
See application file for complete search history.

(56) References Cited

U.S. PATENT DOCUMENTS

| | | | |
|---|---|---|---|
| 2,582,277 A | 2/1946 | Powlison | 343/225 |
| 3,831,296 A * | 8/1974 | Hagle | 434/112 |
| 4,197,524 A | 4/1980 | Salem | 340/147 |
| 4,494,553 A | 1/1985 | Sciarra et al. | 128/721 |
| 4,736,196 A | 4/1988 | McMahon et al. | 340/573 |
| 4,889,131 A | 12/1989 | Salem et al. | 128/671 |
| 5,181,902 A | 1/1993 | Erickson et al. | 600/13 |
| 6,230,135 B1 * | 5/2001 | Ramsay et al. | 704/271 |
| 6,326,901 B1 | 12/2001 | Gonzales | 340/825.46 |
| 6,341,229 B1 | 1/2002 | Akiva | 600/388 |
| 6,359,550 B1 * | 3/2002 | Brisebois et al. | 340/407.1 |
| 6,561,987 B2 | 5/2003 | Pail | 600/534 |
| 6,930,590 B2 | 8/2005 | Ling et al. | 340/407.1 |
| 2003/0020629 A1 * | 1/2003 | Swartz et al. | 340/825.25 |
| 2005/0132290 A1 | 6/2005 | Buchner et al. | 715/702 |
| 2005/0162258 A1 | 7/2005 | King | 340/407.1 |
| 2008/0027507 A1 * | 1/2008 | Bijelic et al. | 607/48 |

* cited by examiner

*Primary Examiner*—George A Bugg
*Assistant Examiner*—Jack Wang
(74) *Attorney, Agent, or Firm*—Brian S. Steinberger; Phyllis K. Wood; Law Offices of Brian S. Steinberger, P.A.

(57) ABSTRACT

Tactile communication methods, systems and devices for wireless touch communication which include an array of electromechanical transducers each independently capable of producing a vibration for communicating qualitative and quantitative tactile cues to a user, at least one electromagnetic field sensor coupled with at least one of the array of transducers for monitoring a change in an electromagnetic field of the array of electromechanical transducers and producing an output signals when a change is detected, wherein a change in a position of a transducer contactor produces the change in the electromagnetic field and a vibrotactile waistbelt for housing the array of electromechanical transducers and sensors, wherein the vibrotactile waistbelt is worn by a user to receive and send wireless touch communication respectively from and to a remotely located controller.

12 Claims, 6 Drawing Sheets

ELECTROMAGNETIC FIELD TACTILE DISPLAY INTERFACE AND BIOSENSOR

This application is a continuation-in-part of U.S. patent application Ser. No. 11/250,878 filed on Oct. 14, 2005 now abandoned and was funded at least in part by Defense Advanced Research Projects Agency (DARPA) TACOM Contract No. DAAE07-03-C-L143..

FIELD OF INVENTION

This invention relates to communications, and in particular to systems, methods, devices, and apparatus using tactile type transducers to be worn by users such as military personal, emergency services, sports participants and referees, gaming users, virtual reality users and the like, as a communication language for communicating information such as instructions, cueing and navigation information between parties.

BACKGROUND AND PRIOR ART

Communicating between individuals has generally required traditional verbal communication devices and systems such as phones, and the like, that are not acceptable and/or practical in certain environments. For example, getting situation-relevant information to dismounted soldiers is key to achieving victory on the battlefield. Indeed, the reliable communication of information regarding the location and severity of threats is part of the goal of the Land Warrior System currently in development by the US Army.

A challenge in accomplishing this task is designing systems for providing information in diametrically opposed scenarios. The first is full-fledged combat, a circumstance replete with a barrage of noise and context-irrelevant signals. The second is that of night covert operations, scenarios in which maintaining silence and the cover of darkness are mandatory for success. Despite the apparent disparities between these scenarios, the information most relevant to soldiers remains the same: locations of threats as well as assets. Due to the critical nature of threat information, it is an absolute necessity to present it through omnipresent communication channels.

Current methods of communication do NOT effectively and covertly alert soldiers to the presence of threats while simultaneously cueing their locations. Due to the constraints of these environments, solutions cannot rely on verbal or visually based systems.

Vision and visual cues are not generally available and always practical in military battle environments. Visual displays of alerts and alarms generally "work" only when the operator looks in their general direction. Also, use of light-based systems during night operations negates the advantage gained through the use of night vision equipment.

Speech and verbal cues are not always available or practical in covert military operations. Verbal communication requires transmission that may be intercepted by unfriendly individuals within range of the communication. The interception would alert the unfriendly individuals of the military personal position which negates the advantages gained by covert operations.

A desired system must appeal to one of two remaining omnipresent sensory systems through which one can derive directional information by audition or touch. Over the years attempts have been made at providing 3-dimensional spatial information both aurally and tactually, but they have achieved limited success.

Users of binaural 3-dimensional audio systems frequently experience front-back reversals, wherein sounds from behind the user are perceived as being in front. In addition, the ability of the auditory system to discriminate among sounds located at different elevations is poor. People often must tilt their heads to localize sounds, especially when their sources are at elevations greater than −13 to +20 degrees from the horizon (Buser & Imbert, 1992), although our ability to resolve sound locations in the horizontal plane is of greater accuracy (McKinley & Ericson, 1997).

As with 3-dimensional audio systems, there have been some attempts for using tactile-based systems. An example of a known system is the Tactile Situation Awareness System (TSAS), a wearable tactile display intended to provide spatial orientation cues (Rupert, 2000). To aid in the development of TSAS, Cholewiak, Collins, and Brill (2001) conducted a study to evaluate the spatial resolution for vibration applied to the torso. They used wearable displays consisting of eight small vibrating devices called tactors, spaced equidistant across the abdomen and arranged to represent the points of the compass (i.e., navel="north," spine="south"). The results showed that participants were very accurate in localizing stimuli applied to the naval and spine (nearly 100%), but accuracy was lower for localizing stimuli on the sides.

The inventors have found that a six-tactor array improved accuracy over that of the eight-tactor array (97% versus 92%, respectively; Cholewiak, Brill, & Schwab, in press). It was also found that the ambiguities regarding localization of vibratory stimuli on the sides could be resolved by modulating vibration frequency. By providing unique sensations in the "east" and "west" positions, significant improvements in localization accuracy (to approximately 95%) were produced, even with an eight-tactor display. Although tactile displays might be somewhat restricted in terms of the number of loci that can be accurately resolved in the horizontal plane, the sense of touch boasts a significant advantage over audition in regards to accurately perceiving stimuli in the vertical plane and in circumventing the problem of front-back reversals.

Use of tactile communication systems might have additional advantages over auditory displays, particularly pertaining to the combat scenario. The prior art suggests that tactile communication might avoid potential conflicts in sharing cognitive resources, a problem that could arise with auditory alarms (Wickens, 1984). Although Wickens' model of attention (1984) lacks an allocation of resources to the sense of touch, there is little ambiguity regarding the effects of resource sharing between tasks appealing to the same sensory modality.

It is unlikely that soldiers will be able to send and receive verbal communications while simultaneously attending to an auditory alarm amidst the noise and stress of combat. Considering the likelihood of task saturation in the auditory channel, a tactile system holds promise not only because of its inherent qualities, but also because it should not interfere with vision or audition (Parkes & Coleman, 1990; Wickens, 1984; Wickens, Sandry, & Vidulich, 1983). Therefore, it is much more reasonable to suspect that soldiers will be able to receive and attend to tactile information (versus auditory information) due to the lack of competition for mental resources and in the relative absence of cross-sensory masking. As information received tactually should not compete with other signals for mental resources, its impact on mental workload is likely minimal.

In environments such as during battles and the like, human senses such as hearing, vision and smell can be overpowered and are impaired. For example, troops may not be able to hear verbal commands and verbal communications when explosions and artillery fire is underway. Tactile sensors can be useful for providing some information but still fail by themselves to effectively communicate desired communications between parties. The inventors are aware of several patents and published patent applications that use some types of tactile stimulation.

See for example, U.S. Publication 2005/0162258 to King which provides a tactile stimulation in response to an alarm condition; U.S. Pat. No. 6,930,590 to Ling, et al. describes a system for delivering tactile stimuli to the skin surface using an array of electrodes directly connected with a pc board and may be used as a wearable article; and U.S. Pat. No. 6,326,901 to Gonzales which includes an array of stimulators for transmitting alphanumeric data.

A number of the referenced applications and patents are directed toward medical devices for monitoring user vital signs or delivering medical treatment to the user. These references include the U.S. Pat. No. 6,561,987 to Pail (respiratory); U.S. Pat. No. 6,341,229 to Akiva (ECG testing); U.S. Pat. No. 5,181,902 to Erickson (pulsed electromagnetic field (PEMF) therapy); U.S. Pat. No. 4,889,131 to Salem (cardiac and respiratory); and U.S. Pat. No. 4,494,553 to Sciarra (cardiac and respiratory) patents. U.S. Pat. No. 4,736,196 to McMahon is a monitoring system that can be used to track the location of a wearer.

U.S. Publication 2005/0132290 to Buchner, et al. discloses the closest prior art of a method and apparatus for transmitting information to a user's body using standard codes and an actuator that can be used to transmit tactile, vibrational, heat, pressure or electric pulses to transmit information using the skin as an interface to the user wherein the apparatus is contained in a wearable garment or accessory. The device described in Buchner is complex and includes a display for viewing an emotional state using symbols or moving images and can be used to listen to recorded music. The biometrics are processed by an expression interpreter to determine emotions.

Other art made of record includes U.S. Published Patent Applications: 2005/0173231 and 2005/0152325 to Gonzales; 2005/0073439 to Perricone; 2003/0109988 to Geissler; and 2002/0145522 to Pembroke. See also U.S. Pat. No. 6,856,578 to Magine; U.S. Pat. No. 6,771,224 to Apostolos; U.S. Pat. No. 6,392,540 to Brown; U.S. Pat. No. 6,326,901 to Gonzales; U.S. Pat. No. 6,320,496 to Sokoler; U.S. Pat. No. 5,719,561 to Gonzales; U.S. Pat. No. 4,008,456 to Ewart; U.S. Pat. No. 3,736,551 to Hirsch; and U.S. Pat. No. 3,108,268 to Uttal.

However, none of the above references disclose an apparatus or method for communicating qualitative and quantitative tactile cues while also monitoring user vital signs that is usable for covert operation without broadcasting signals that may be intercepted by unfriendly individuals within range.

SUMMARY OF THE INVENTION

A primary objective of the present invention is to provide a novel tactile communication language using tactile devices, apparatus, systems and methods that can instruct and/or cue and/or navigate and/or guide and/or provide information to user(s) wearing such aid that is not encumbered by senses such as vision and hearing.

A secondary objective of the present invention is to provide devices, methods, systems and apparatus for two-way communication through the sense of touch via transducers, speaker-like devices that vibrate against the skin while using the transducers as a system input device.

A third objective of the present invention is to provide devices, methods, systems and apparatus for a tactile communication language using tactile devices, apparatus, systems and methods for communicating and/or instructing and/or cueing and/or navigating and/or conveying guidance information using an alternative communication channels covertly, naturally, and uncluttered by visual and/or auditory communications.

A fourth objective of the present invention is to provide devices, methods, systems and apparatus for a tactile communication language using tactile devices, apparatus, systems and methods for using a transducer-based tactile display as a system input device, the same type of EMF monitoring could be used for monitoring user vital signs to determine electronically if a user of our tactual displays is under duress, incapacitated, or deceased.

A fifth objective of the present invention is to provide tactile communication devices, apparatus, systems and methods for use in military tactics, tactile communication, use in video gaming and entertainment applications, use with robotics, and applications for persons with sensory impairments (e.g., directional cues for people with visual impairments) and is especially appropriate for first responders such as firefighters, who could benefit from use of non-visual communication and vital sign monitoring.

The present invention provides a solution to overcome these limitations with the prior art techniques. The devices, methods, systems and apparatus of the present invention provide two-way communication through the sense of touch via transducers, speaker-like devices that vibrate against the skin while using the transducers as a system input device.

A preferred embodiment provides a wireless touch communication device that includes an array of electromechanical transducers each independently capable of producing a vibration for communicating qualitative and quantitative tactile cues to a user, wherein the array of electromechanical transducers produce a vibration to provide information to the user, at least one electromagnetic field sensor coupled with the array of transducers for monitoring a change in an electromagnetic field of the electromechanical transducers and producing an output signals when a change is detected, and a vibrotactile waistbelt for housing the array of electromechanical transducers and sensors. A change in position of a transducer contactor produces the change in the electromagnetic field so that when the vibrotactile waistbelt is worn by a user to receive and send wireless touch communication respectively from and to a remotely located controller.

In an embodiment, the array includes at least six electromechanical transducers in a ring configuration, wherein a remotely located controller selectively activating individual electromechanical transducers of the array for communicating tactile cues to the user and the electromagnetic field sensor detects at least two different changes in electromagnetic field. The at least two different changes in electromagnetic field include a long duration change and a short duration change. The wireless touch communication device includes a processing device for detecting a pattern of changes in the electromagnetic field, wherein the pattern detected occurs as a natural consequence of respiration which causes a change in position of a transducer contactor which is used to determine a user vital sign.

A second embodiment provides a wireless touch communication system having an array of electromechanical transducers each independently capable of producing a vibration for communicating qualitative and quantitative tactile cues to a user, an electromagnetic field computer sensor for monitoring a change in an electromagnetic field of the array of electromechanical transducers and producing an output signals when a change in the electromagnetic field is detected, a vibrotactile waistbelt for housing the electromechanical transducers and computer sensor, wherein a vibration from the transducers stimulate skin receptors of a user for communicating the tactile cues and depression of a transducer contactor causes the change in electromagnetic field for sending information, and a processing device connected with a manually activated input device for a second user to send touch tactile cues to the user and to receive wireless communication from the user.

The computer sensor monitors the electromagnetic field change to determine the user's physiological status because the user's respiration causes a change in the position of the transducer contactor which results in the change in electromagnetic field. The computer sensor also monitors the electromagnetic field change to detect a predetermined pattern caused by the user physically moves the transducer contactor to cause the electromagnetic field change for communicating with the second user. A predetermined pattern is a series electromagnetic field changes caused by a series of user transducer contactor movement, such as a user taping the electromechanical transducer to cause the series of contactor movement. In an embodiment, the computer sensor detection includes detection of at least two different contactor movements, wherein the at least two different contactor movements includes long and short durations of electromagnetic field change, the long duration electromagnetic field change lasting longer in time than the short duration electromagnetic field change. Alternatively, the computer sensor detects simultaneous movement of more than one of the transducers in the array of electromechanical transducers.

Applications of the novel communication devices, systems and methods can be in military use, police use, emergency services such as firemen and rescue use, as well as entertainment use, internet, sports, and the like.

Further objects and advantages of this invention will be apparent from the following detailed description of the presently preferred embodiments which are illustrated schematically in the accompanying drawings.

DESCRIPTION OF THE PREFERRED EMBODIMENTS

Figure 1:
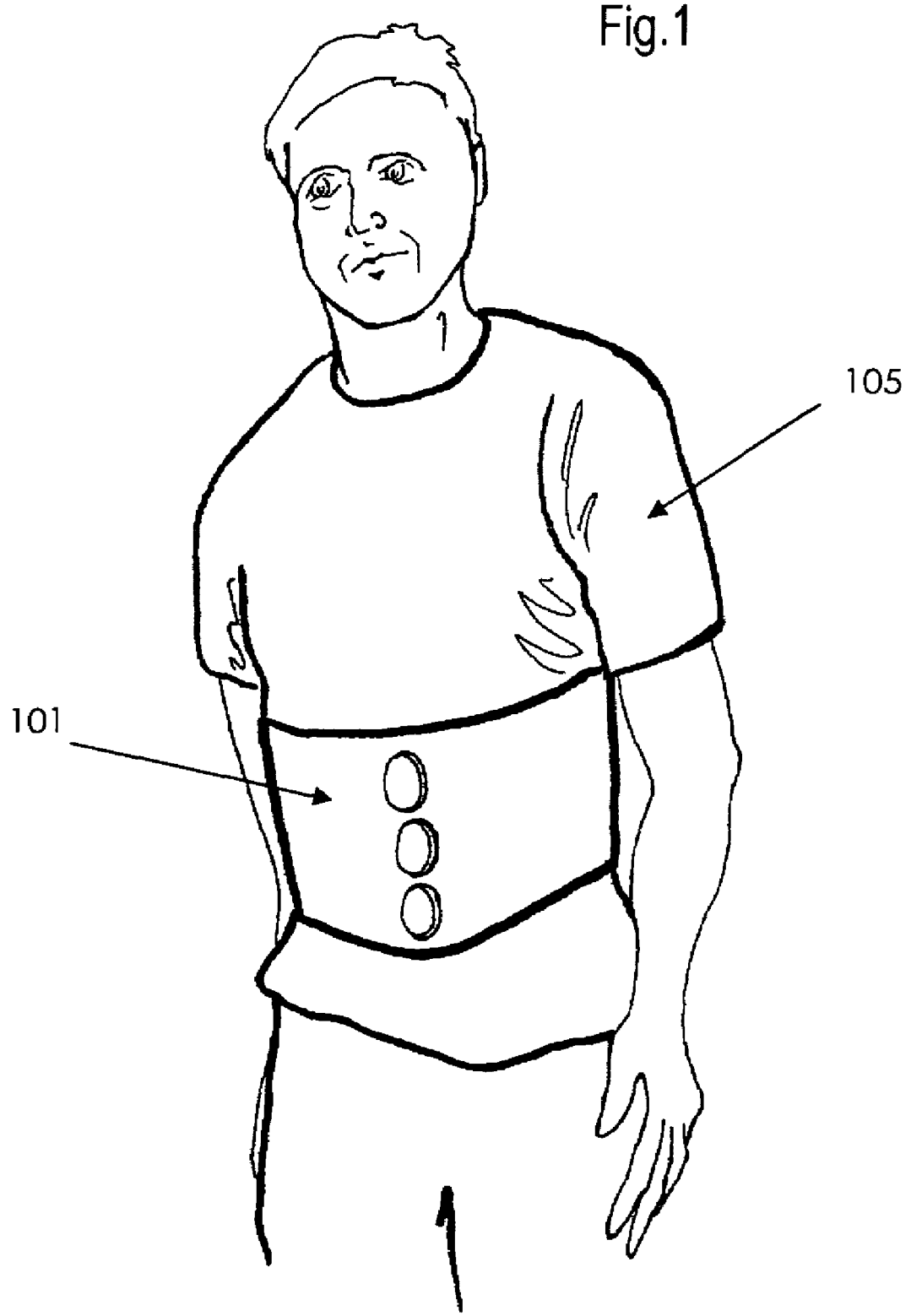
FIG. 1 shows a user with an experimental display setup, with vertical disks added to illustrate tractor placement.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

The following is a list of the reference numbers used in the drawings and the detailed specification to identify components:

| | |
|---|---|
| 100 | vibrotactile waistbelt |
| 101 | elastic belt |
| 110 | electromechanical transducers |
| 120 | vertical array of electromechanical transducers |
| 130 | cabling |
| 140 | computer driver |
| 150 | power supply |
| 160 | power cord |
| 170 | electromagnetic field sensor |
| 200 | manually activated input device |
| 210 | tactile cue switches |
| 220 | position switches |
| 300 | hardware configuration |
| 310 | input device |
| 320 | hardware driver |
| 330 | tactile language display |

One way of communicating through the sense of touch is via transducers, speaker-like devices that vibrate against the skin. Traditionally, communication through these devices has been one-way; a signal is sent and the devices merely vibrate. The invention described in co-pending parent patent application Ser. No. 11/250,878 filed on Oct. 14, 2005 and assigned to assignee of the present application and having at least one common inventor, which is incorporated herein by reference hereto, uses an easily interpretable "natural" code, where an azimuth: ring of vibratory devices on torso—pulse indicates vector. Elevation: drawing a saltatory "arrow" on the skin using independent loci of stimulation. Together a combination of signals can indicate whether targets are located above or below horizon.

In addition to communicating through the sense of touch via transducers, speaker-like devices that vibrate against the skin, the present invention also uses these transducers as a system input device. Electromechanical transducers rely upon electromagnetism (via wire coil, magnet) to deliver vibration into the skin via a moving contactor/plunger. When the contactor/plunger is physically moved with one's finger (e.g., a tap), a change occurs in the electromagnetic field (EMF) that is generated by the device.

The system of the present invention includes a network of transducer-based tactile displays each having a set of transducers that are worn adjacent to the user's skin and a computer sensor to monitor the EMF characteristics of the device and respond appropriately when a predetermined pattern of EMF change is detected. Use of multiple tap patterns among multiple transducers would allow for tremendous flexibility in the number and types of commands that could be sent via the display.

In addition to using the transducer-based tactile display as a system input device, the same type of EMF monitoring could be used for monitoring user vital signs. Combat troops are one of the primary populations likely to use the network of tactual displays. Previously, there was no way of determining electronically if a user of our tactual displays is under duress, incapacitated, or deceased. Based upon the aforementioned use of EMF pattern matching, the present invention allows for monitoring physiological status of the individual wearing the device.

The tactile display described in the cop-pending parent patent application Ser. No. 11/250,878 is worn around the abdomen and mechanically loaded against the body with approximately 45 grams of force to maintain good mechanical coupling between the transducers and the skin so as to allow the vibration from the transducers to stimulate the skin receptors. As the tactile display is worn, the amount of force with which the transducers press against the skin varies as the wearer inhales and exhales. A natural consequence of respiration is a slight change in the position of the transducers' plungers. In other words, breathing causes the plungers in the transducers to move slightly, causing a change in the EMF characteristics of the devices. The amount of change in each device is slight, so it is likely that the EMF signatures of multiple devices must be monitored for a larger, consensus signal. In doing so, the system is able to determine if a user is breathing, and at approximately what rate.

Referring to FIG. 1, experimental apparatus components included a Tactile display system consisting of three electromechanical transducers (tactors/emitters) 6 and three computer sensors (not shown) coupled with the three electromechanical transducers 6 connected with an eight-inch wide elasticized Velcro band 120; and a PC (Personal Computer) with custom software for operating the electromagnetic field tactile display interface and biosensors. In the application 100 shown in FIG. 1, a user 105 was able to wear the belt 101 of emitters around their waist.

The process and procedure presented a sequence of vibrotactile signals (approximately 250 Hz sinusoid) at three vertically-situated loci spaced at approximately 5 cm. The display was placed either on the abdomen with the center loci positioned just above the navel or on the spine at the same height. The method of limits procedure was used to obtain the thresholds for perceiving the "goodness" of tactile phi phenomenon (smooth line vs. independent taps). Stimulus durations and inter-stimulus onset intervals (ISOI) were equalized; no two loci were simultaneously activated. The duration range=approximately 20 to approximately 120 msec, approximately 10 msec increments.

Three variables manipulated included:
stimulus strength (12 dB vs. 24 dB above mean threshold)
display position (abdomen vs. spine)
direction of cue (up vs. down)

Repeated-measures included all participants received all possible stimulus combinations across 32 trials, with a randomized presentation order.

Figure 2:
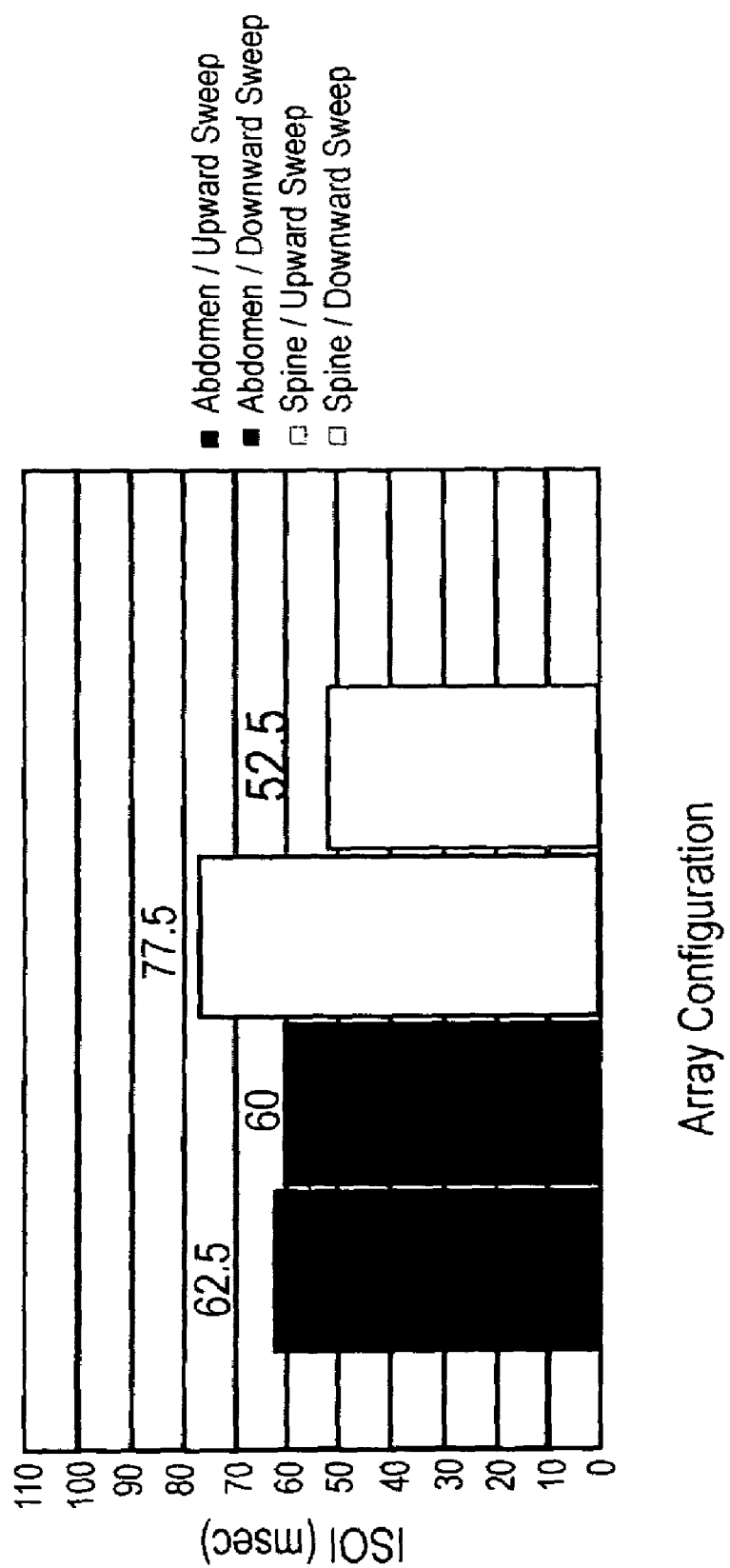
FIG. 2 is a graph of mean thresholds for strong (approximately 24 dB) vibrotactile signals.
Figure 3:
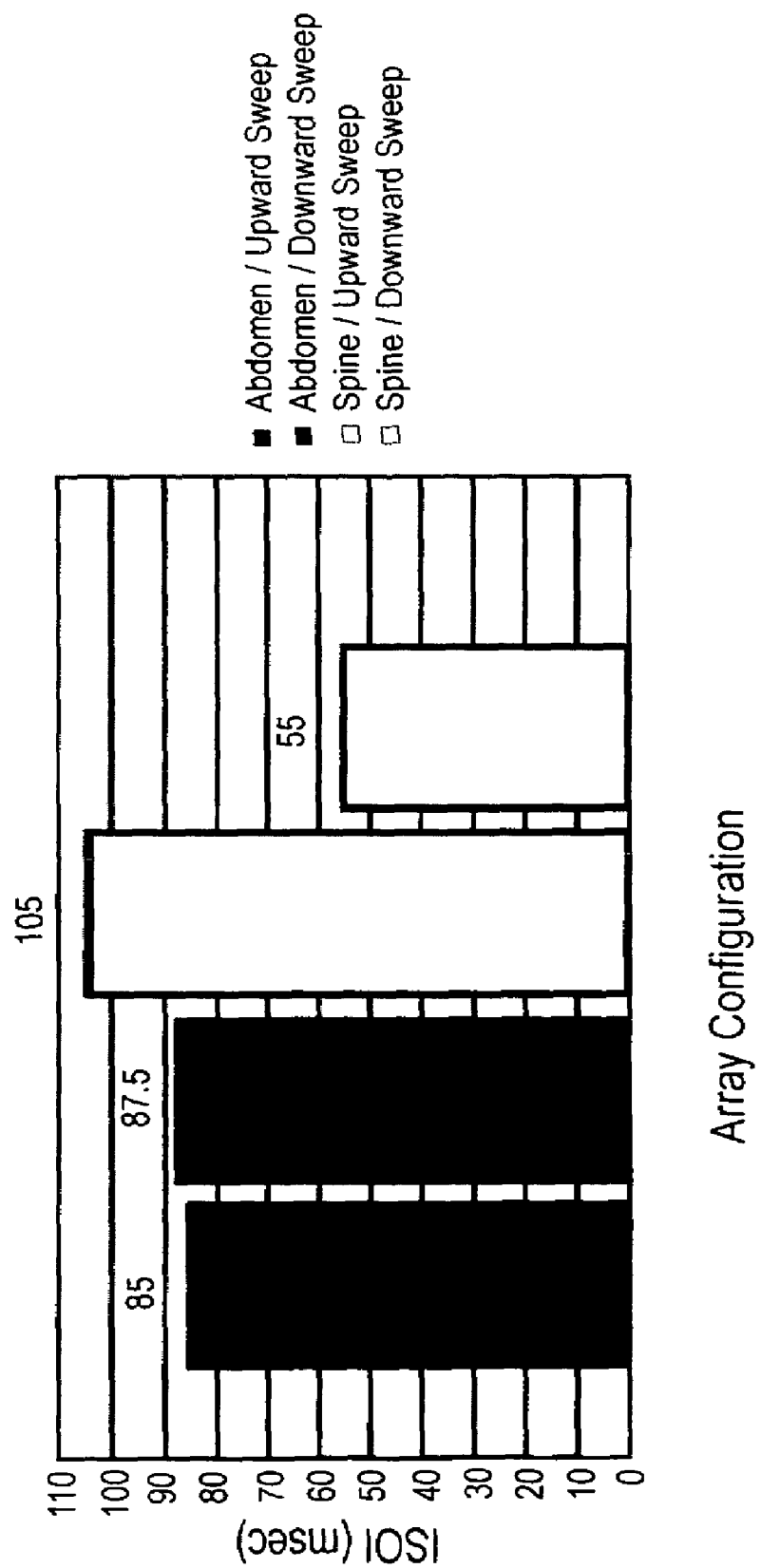
FIG. 3 is a graph of mean thresholds for weak (approximately 12 dB) vibrotactile signals.

The data in the results suggest several trends shown in FIGS. 2 and 3. The inter-stimulus onset intervals obtained for low intensity were longer (approximately 20 msec) for the abdomen than for the spine inter-stimulus onset intervals for thresholds obtained from abdominal stimulation appear to be quite consistent regardless of the direction of the saltatory sweep.

Various timing differences were observed for spinal stimulation. Inter-stimulus onset intervals required to produce the tactile phi phenomenon were greater for upward rather than downward sweeps (approximately 20-40 msec difference). This difference was particularly pronounced for "weak" vibratory signals. Regardless of body site or intensity, directionality of sweep was accurately identified 100% of the time.

The testing results suggest that wearable aspects of array configuration would systematically influence the tactile phi phenomenon. Influence of bone conduction is a possible explanation for the differences observed in spinal stimulation. From the applied perspective, data suggest an abdominal configuration might provide greater stability for presenting tactile motion cues. This stability holds implications for developing a directional cueing system with reduced complexity and with fewer resource requirements.

A current goal of the US Army's Land Warrior System is reliable communication of the presence and location of threats. To obtain the greatest benefit from such a system, it should be omnipresent, covert, and it should be usable in a variety of combat scenarios. The subject inventors compared the relative benefits of 3-dimensional audio and wearable tactile display systems in meeting these demands. Although 3-dimensional audio cueing might provide slightly better spatial resolution in one dimension, a tactile-based solution is ultimately of greater utility in all dimensions. Benefits of a tactile-based system include greater overall accuracy in directional cueing, less competition for cognitive-perceptual resources, and virtually silent operation.

Figure 4:
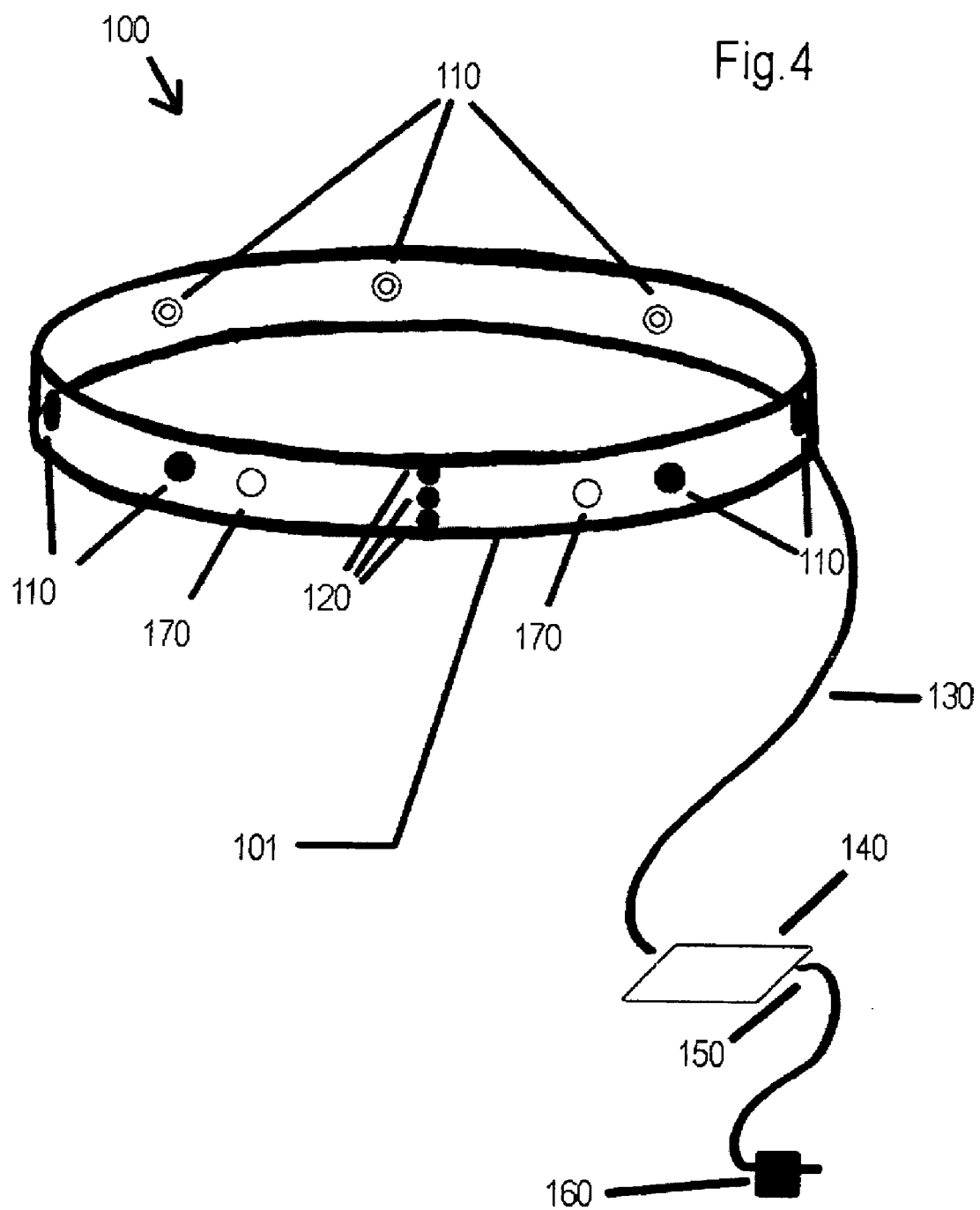
FIG. 4 shows a perspective view of a belt of tactile vibrators.

FIG. 4 shows a perspective view 100 of a novel belt 101 that can be worn on a waist of a soldier and be used to communicate information to and/or signal and/or cue the soldier. The belt 101 can be a single continuous elastic belt and/or have a hook and loop fastened ends. The belt 101 can have an array of individual electromechanical transducers 110 equally spaced apart from one another and/or include separate vertical array(s) 120 of the electromechanical transducers. The arrangement can include connecting the individual electromechanical transducers 110, 120 and sensors 170 to a cabling tether such as a wire 130 and a computer driver 140 with power supply and optional AC power supply or on board battery power 150 or a plug 160 for connecting to for example 120 volt wall power supplies. The computer driver 140 consists of a computer circuit board with a programmable microcontroller chip, a signal generator, and an amplification system for selectively activating the electromechanical transducers and a receiver for receiving output signals from the electromagnetic field sensor devices 170.

The novel arrangement 100 in parent patent application Ser. No. 11/250,878, includes an application for example, when a target pops up, to the right of the soldier, a wearable computer 140 wearable on the soldier can detect a sound and/or visual emission, and immediately send a signal to the electromechanical transducers 110, 120 on the belt 101 and a consistent vibration can begin near a right hip. As the soldier pans right to the target, the buzzing (vibration) can move left across the waist of the soldier. When the vibration becomes centered over the belly button of the soldier, that's the cue to for the soldier to aim their weapon and fire. After firing, the buzzing would then stop.

A squad of soldiers can be fit with the belts 101 vibrators, and an acoustic sensor can be attached to the solders and/or to a vehicle on which the soldiers are riding. If a sniper shoots at the vehicle, a computer onboard the vehicle can activate vibrators that are closest to the direction of the fired shot. All of the soldiers then can be given immediate direction cue by the worn vibrators to fire directly toward the gunmen. A revenge type kill occurs where the ambusher may get off only one round, but everybody in the unit of soldiers can be immediately oriented to the direction of the gunmen, to take the gunmen out together.

A preferred embodiment of the tactile communication device includes an array of electromechanical transducers adapted to be worn by a user for two-way communication, and a sensor for monitoring an electromagnetic field generated by the array of transducers and producing an output signals when the electromagnetic field changes. An output signal is produced by the sensor when the user physically moves a transducer contactor/plunger because the physical movement causes a change in the electromagnetic field generated by the transducer. A change in electromagnetic field also occurs as a natural consequence of respiration which causes a change in position of a transducer plunger. The sensor monitors the change in electromagnet field to determine a user vital sign.

In an embodiment, the system includes a tactile display interface and sensor device to be worn by a user for receiving tactile cues and sending output signals for two-way communication and a control for remotely selectively activating individual tactile emitters of the array and monitoring the output signals from the sensor, the control being adapted for use by another for sending tactile cues, wherein operating the control provides a communication of information to the user. The controller also collects sensor output signals to monitor user vital signs. Using the electromagnetic transducers, the user sends tactile cues to the controller.

The electromagnetic field sensor detects at least two different changes in electromagnetic field. One is a long duration change and a short duration change, wherein the long duration change is longer than the short duration change. In an embodiment, the electromagnetic field sensor includes a processing device for detecting a pattern of changes in the electromagnetic field.

In an embodiment, the array of electromechanical transducers includes at least six tactile emitters in a ring configuration such as on a belt, and the like. Each of the tactile emitters includes activation of at least two different emissions. The at least two different separate emissions can include at least one short duration frequency vibration burst, and at long duration frequency burst, the long duration frequency burst lasting longer in time than the short duration frequency burst.

The invention includes a novel method of communicating information with tactile emitters that can include the steps of providing an array of electromechanical transducers adapted to be worn by a user, providing a computer sensor coupled with the electromechanical transducers for monitoring an electromagnetic field generated by the electromechanical transducers and providing a response when a predetermined pattern of electromagnetic field is detected. An embodiment includes providing a control with switches that is remotely located from the array; communicating information between the control and the array by activation of the switches, wherein the switches operate different groups of the emitters on the array.

In the example shown, each belt has eight (8) emitters/vibrators equally spaced apart from one another on the belt, with three in front, three across the back and one on each side (right, left) of the users. A control box, shown in reference to FIG. 4, can be used by a leader remotely located away from the soldier(s), wherein the control can include switches such as depressible buttons, that each activate different groups of electromechanical transducers on the belt(s).

Alternatively, the user communicates with the leader by depressing a contactor of the electromechanical transducers to cause a change in the electromagnetic field generated by the transducer. Sensors coupled with the transducers monitor a change in the electromagnetic field to detect a pattern of electromechanical field changes for communicating information between the array of transducers and the control. Monitoring the electromagnetic field includes detecting electromagnetic field change caused by a slight change in the transducer contactor as a natural consequence of respiration and the controller determining a vital sign of a wearer by the detected electromagnetic field.

FIG. 4 shows the front interface 200 of a small computer such as a pocket personal computer (e.g., Dell Axim, Hewlett Packard iPAQ), PDA (personal digital assistant), having a touch screen of depressible type buttons that can be used by a remotely located leader to communicate to the soldiers wearing the belt array of electromechanical transducers and sensors. The screen can be an LCD (liquid crystal) type display screen with depressible type buttons. Alternatively, or in combination, the control 200 include a thumbstick, and/or pressure pads with OLED (organic light emitting diode) displays.

The control 200 can send and receive signals to and from the novel belts via a wireless protocol such as but not limited to the worldwide web, Bluetooth or 802.11, by other media such as but not limited to RF (radio frequency), IR (infrared), ultrasonic, and the like, and combinations thereof.

Figure 6:
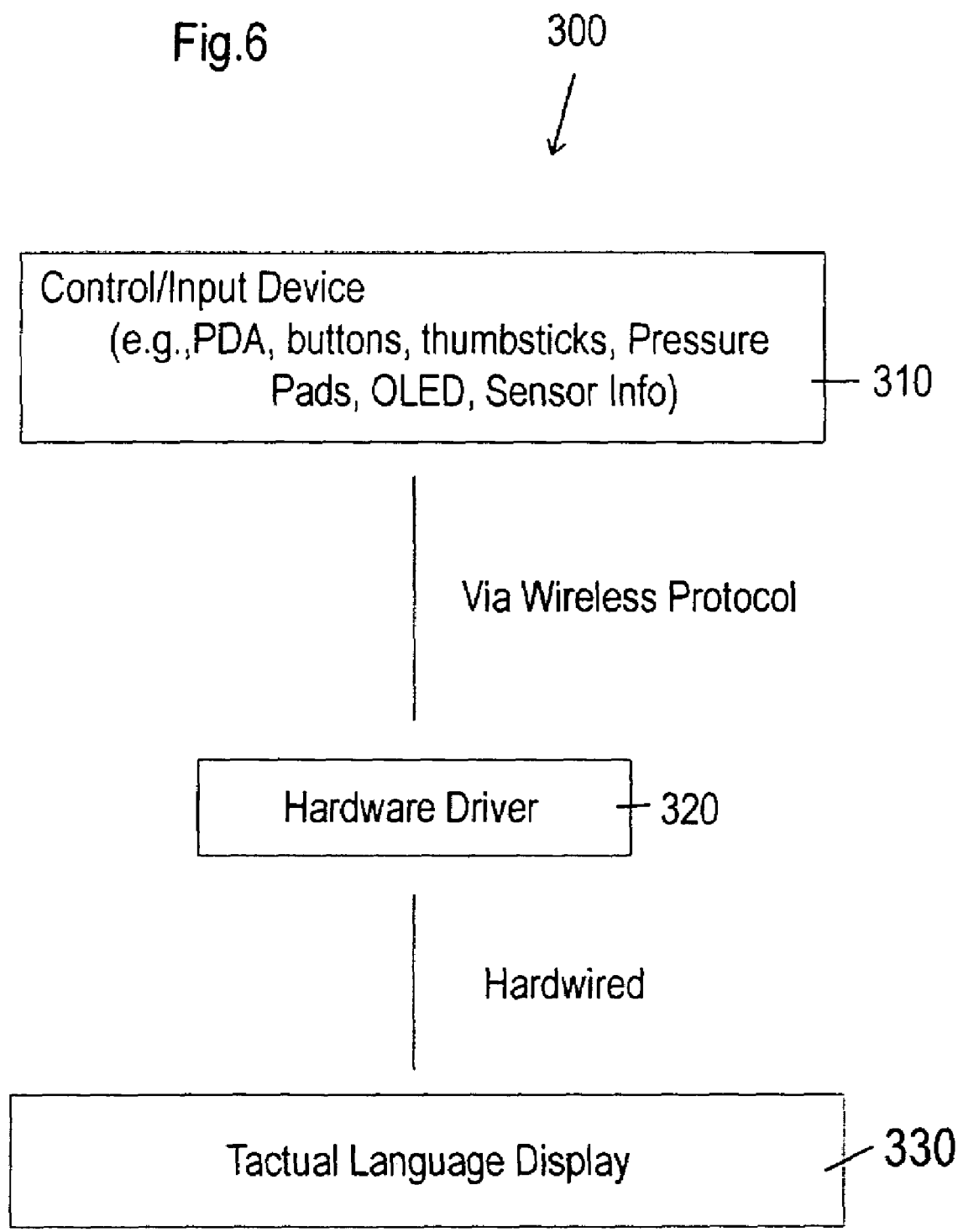
FIG. 6 shows a basic hardware configuration of the components that can be used.

FIG. 6 shows a basic hardware configuration of the components that can be used. Operation can include:
1. Connect the tactile display belt to the hardware driver/controller (plug-in).
2. Power on the hardware driver.
3. Power on the input device (if necessary)—depending upon the use, the display might be configured for passive reception of signals.

Figure 5:
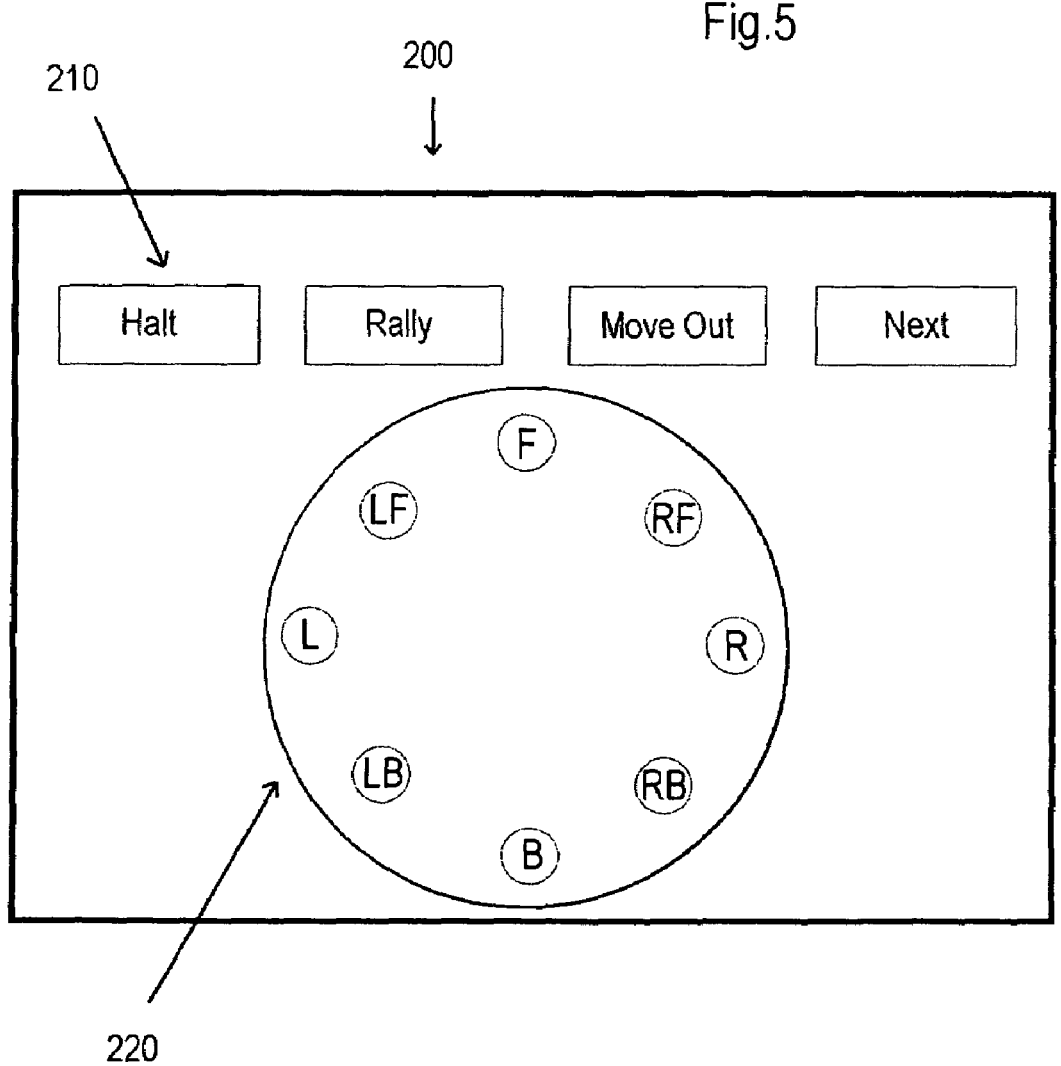
FIG. 5 shows a manually activated input device with buttons/switches that can activate different groups of emitters/vibrators on an array.

Referring to FIG. 6, the control/input device 310 (200 FIG. 5) can be used to send control signals via a wireless protocol to a hardware driver 320 which is hardwired to the tactual language display 330 (the belt of emitters/transducers) so that the leader/commander communicates language to the wearer of the belt.

In addition to military type tactics and tactile communication type applications, the invention is capable of other applications. For example, the invention has applicability for use with first responders, use in videogaming and entertainment applications, use with robotics, vehicle navigation, and applications for persons with sensory impairments (e.g. directional cues for people with visual impairments).

First Responders—Communications during emergency situations can be problematic due to radio interference, crosstalk, and noise. Police and fire department personnel can use the tactile communication system to send and receive critical information, whether in a burning building, a smoke-filled street, or a chaotic crowd of people.

Videogamers/Virtual Reality—The tactile language system can be used for enhancing videogame play and virtual reality. Newer videogames are designed for team-based cooperative play and communication is essential. Current modes of communication rely upon typing text or talking into headset microphones. The tactile communication system would be an excellent means of communicating with team mates covertly, particularly for players with dial-up connections that prohibit voice communications.

Internet Communication—The tactile language system can be used for basic internet communication. Chat software already incorporates custom visual icons to represent individuals . . . why not use custom touches? A tactile icon can tell you who wants to chat, and whether it's someone you want to chat with.

Sports—Another domain for the tactile language system is sports. Coaches and catchers communicate with baseball pitchers using cryptic hand signals. The tactile communication system would be an excellent means for communicating this information wirelessly and covertly. The NFL (National Football League can benefit. Quarterbacks are the only players permitted communication with coaches; however, the roar of the crowd can drown out the coach. Rather than rely upon hearing, play information can be communicated reliably through touch to the quarterback and no one else.

Transportation—The tactile language system can be integrated with OnStar, PDA map software, or other GPS navigation system to indicate the locations of landmarks (e.g., restaurants, schools, churches, office buildings, stores). Patterns would tell drivers not only location, but the type of business by touch. Some business locations can be pointed out through special tactile versions of their logos.

Disabled—The tactile language system can be used as a communication aid for people with sensory disabilities. Going beyond simple alerts and alarms, the tactile communication system could wirelessly tell the deaf of a telephone call (TTY) and even the identity of a caller through a custom tactile icon. It can also be used to indicate more advanced alert information (e.g., fire, tornado). For the blind, it can be used for navigation, not only by guiding people via directional cues but also by indicating location (similar to that of the aforementioned car navigation systems).

Although a preferred example of using the invention is attaching a belt of an array of emitters/transducers around a waist, the invention can be attached to different areas of the body. The body portion can be a hand of the user. The body portion can be a wrist of the user. The body portion can be an arm of the user. The body portion can be a leg of the user. The body portion can be an ankle of the user. The body portion can be a foot of the user. The body portion can be a neck of the user. The body portion can be a head portion of the user, where the array of emitters is worn in a helmet, hat and/or is part of a band about the head of the user.

In addition to an array ring of emitters/transducers, the array can be a curve section. The array can be a vertical oriented array section, a horizontal oriented array section or any combination thereof.

Still furthermore, the communication can be two way where the user(s) can also have a control and the leader can also have an array of emitters/transducers.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A wireless touch communication device consisting of:
an array of depressable electromechanical transducers to receive and send wireless touch communication each one of the electromechanical transducers independently capable of producing a vibration for communicating qualitative and quantitative tactile cues to a user, wherein the array of electromechanical transducers produce the vibration to provide information to the user;
at least one electromagnetic field sensor coupled with at least one of the array of transducers for monitoring a change in an electromagnetic field of the array of electromechanical transducers to detect at least one of a long and a short change when one or more of the electromechanical transducers is depressed by the user and producing at least two different output signal each having a different duration frequency burst when a change is detected for sending wireless touch communication from the user to a remotely located controller, wherein a change in a position of a transducer contactor produces the change in the electromagnetic field;
a processing device connected with at least one electromagnetic field sensor to receive the output signal from the at least one electromagnetic field sensor to detect a pattern of changes in the electromagnetic field;
a power source for supplying power to the wireless touch communication device;
a transceiver connected with the processing device for receiving and transmitting two-way wireless touch communication; and
a vibrotactile waistbelt for housing the array of electromechanical transducers, processing device and at least one electromagnetic field sensor to be worn around the abdomen and mechanically loaded against the body with approximately 45 grams of force to maintain mechanical coupling between the array of transducers and the skin to allow vibration from each transducer to stimulate the skin receptors, wherein the vibrotactile waistbelt is worn by the user to receive and send wireless touch communication respectively from and to the remotely located controller.

2. A two-way wireless touch communication system consisting essentially of:
an array of depressable electromechanical transducers to receive and send wireless touch communication, each one of the array of electromechanical transducers independently capable of producing a vibration for communicating qualitative and quantitative tactile cues to a user;
an electromagnetic field computer sensor connected to the array of depressable electromechanical transducers for monitoring a change in an electromagnetic field of the array of electromechanical transducers and producing different output signals when a change in the electromagnetic field of a different one of the array of electromechanical transducers is detected, a long and a short depression of one or more of the electromechanical transducers by the user causing the change in the electromagnetic field for sending a corresponding one of a long and a short duration different frequency burst as tactile cues from the user, the long duration longer than the short duration;
a vibrotactile waistbelt worn around a part of the body mechanically against the body with approximately 45 grams of force to maintain mechanical coupling between the array of transducers and the skin to allow vibration from each transducer to stimulate the skin receptors of the user, the vibrotactile waistbelt housing the electromechanical transducers and computer sensor and having a power source connected therewith, wherein the vibration from the transducers stimulate skin receptors of a user for communicating the tactile cues and depression of a transducer contactor causes the change in electromagnetic field for sending tactile information; and
a processor connected with a manually activated input device for a second user to send touch tactile cues to the user and to receive wireless communication from the user.

3. The wireless touch communication system of claim 2, wherein the computer sensor monitors the electromagnetic field change to determine the user's physiological status, wherein the user's respiration causes a change in the position of the transducer contactor which results in the change in electromagnetic field.

4. The wireless touch communication system of claim 2, wherein the computer sensor monitors the electromagnetic field change to detect a predetermined pattern, wherein the user physically moves the transducer contactor to cause the electromagnetic field change for communicating with the second user.

5. The wireless touch communication system of claim 4, wherein the predetermined pattern is a series of changes caused by a series of user transducer contactor movement.

6. The wireless touch communication system of claim 5, wherein the computer sensor detection includes detection of at least two different contactor movements.

7. The wireless touch communication system of claim 6, wherein the at least two different contactor movements includes long and short durations of electromagnetic field change, the long duration electromagnetic field change lasting longer in time than the short duration electromagnetic field change.

8. The wireless touch communication system of claim 2, wherein the computer sensor detects simultaneous movement of more than one of the transducers in the array of electromechanical transducers.

9. The wireless touch communication system of claim 2, wherein each of the array of electromechanical transducers includes detection of at least two different emission signals from the manually activated input device.

10. The wireless touch communication system of claim 9, wherein the at least two different separate emission signals include: at least one short duration frequency vibration burst, and at long duration frequency burst, the long duration frequency burst lasting longer in time than the short duration frequency burst.

11. The wireless touch communication system of claim 9, wherein the manually activated input device includes:
a plurality of switches, each switch activating a different grouping of electromechanical transducers in the array.

12. The wireless touch communication system of claim 11, wherein one grouping includes a sequentially activation of electromechanical transducers along one direction in the array directs the user to attention and prepare.

* * * * *